United States Patent Office 3,477,865
Patented Nov. 11, 1969

3,477,865
ALUMINA TRIHYDRATE-FIBROUS MATRIX COMPOSITION AND METHOD OF FORMING SAME
Bernard F. Armbrust, Jr., Benton, and Val G. Carithers, Little Rock, Ark., assignors to Reynolds Metals Company, Richmond, Va., a corporation of Delaware
No Drawing. Continuation-in-part of application Ser. No. 372,369, June 3, 1964. This application Sept. 27, 1967, Ser. No. 671,098
Int. Cl. C08h *17/34;* C08b *23/00*
U.S. Cl. 106—209                                              5 Claims

ABSTRACT OF THE DISCLOSURE

An alumina-asbestos fiber sheet having a high degree of flexibility, and which is adapted to be shredded or ground, is prepared from finely divided alumina hydrate, asbestos and a vegetable gum binder, such as guar gum or a synthetic gum binder, with optional inclusion of a plasticizer. Other inorganic materials such as alkaline earth metal or magnesium oxide, hydroxide, or carbonates, or their hydrates may be substituted for the alumina. Ceramic or cellulosic fibers may be substituted for the asbestos. The product is useful for heat insulation and as a tobacco additive.

CROSS REFERENCE TO RELATED APPLICATION

This application is a continuation-in-part of application Ser. No. 372,369, filed June 3, 1964, now abandoned.

BACKGROUND OF THE INVENTION

Mixtures of asbestos together with fillers and relatively large amounts of synthetic resin binders for use as insulating compositions are well known in the art. These compositions have occasionally employed minor amounts of alumina trihydrate as an ingredient but they have not been available in the form of a self-supporting sheet.

SUMMARY OF THE INVENTION

This invention relates to a novel self-supporting sheet material including an inorganic compound, a fibrous matrix material, and an organic or inorganic binder, and to the method of forming said sheet. More particularly, the invention concerns an alumina-asbestos fiber sheet material having a high degree of flexibility, and which is adapted to be subdivided into fibrous particles, as by shredding or grinding.

Sheet material prepared in accordance with the invention is capable of a wide variety of industrial applications, particularly for heat insulation purposes, as for example, in pipe wrapping, building construction, thermal insulation for walls and the like. In its shredded form, the novel sheet material of the invention is adapted for use as a combustion temperature control substance, suitable for admixture with tobacco, as disclosed in copending application Ser. No. 475,331, filed July 28, 1965, now U.S. Patent 3,410,276.

The practice of the invention will be illustrated with reference to the formation of a self supporting sheet of alumina, but it is to be understood that the principles and practice of the invention are capable of much wider application. In accordance with a preferred embodiment of the invention, a self supporting sheet material may be prepared from a finely divided inorganic compound, asbestos, and a vegetable gum binder.

The inorganic compound may include, for example, an oxide, hydroxide, or carbonate, or a hydrated form thereof, of an alkaline earth metal, such as calcium, or of magnesium, or of aluminum, or of titanium, or a mixture of these materials, or a mineral such as clay. A major proportion of the inorganic compound is admixed with a minor proportion of the fibrous matrix material, and a small amount of the binder. If desired, a plasticizing substance, such as glycerine or a glycol may be included in the mixture.

Where alumina is employed as the principal ingredient of the sheet of the invention, it is preferably in the form of crystalline alumina hydrate, which may be represented by the formulas $Al_2O_3 \cdot 3H_2O$ or $Al(OH)_3$. These are free-flowing white crystalline products available in abundance from the Bayer, or Bayer-sinter process. The combined water is releasable upon heating, starting at a temperature of about 150° C.

The fibrous matrix material may be composed of either inorganic or organic fibers or a mixture thereof. Examples of inorganic fibrous materials include asbestos, or also a ceramic fiber made from alumina and silica (aluminum silicate), sold under the designation "Fiberfrax" (Carborundum Co., Niagra Falls, N.Y.), or a low melting point sodium borosilicate type glass frit of the type sold under the designation "Ferrofrit" (Ferro Corp., Cleveland, Ohio). Cellulosic fibers may also be employed, both natural, such as paper (unbleached kraft fibers or bleached sulfate or kraft pulp) or cotton, or modified, such as for example, rayon, as well as synthetic fibers such as nylon, polyester, and the like.

Where asbestos is employed, it is preferably a hydrous magnesium silicate of the tubular fiber type, of which an example is chrysotile asbestos, having the approximate formula $3MgO \cdot 2SiO_2 \cdot 2H_2O$. This material has a fibrous crystal structure and silky luster, is white in color, and exhibits very good tensile strength. There may also be employed crocidolite type asbestos, which is a complex sodium iron silicate, which also possesses high tensile strength, and which is of a lavender color.

Other fibrous materials which may be employed include kraft pulp, sulfite paper pulp, glass wool, kraft paper, and No. 150 cotton thread.

The organic binder may be a natural or synthetic gum, the term as employed herein including, for example, vegetable gums, such as gum arabic, gum tragacanth, and other water soluble gums, which consist largely of carbohydrates and are hydrophilic colloids. There may also be employed synthetic gums, such as ethylated starch, and various cellulose ethers, such as for example, methylcellulose, or hydroxypropylcellulose. These are obtainable in aqueous solution, the methylcellulose solution having a viscosity of about 4000 centipoises, while the solution of the hydroxypropylcellulose has a viscosity of about 15,000 centipoises.

Where a vegetable gum is employed as a binder for the inorganic compound of the alumina sheet of the invention, it is preferably a carbohydrate type, such as, for example, guar gum, derived from the seeds of *Cyamopsis tetragonolobus*, which exhibits a high degree of water dispersibility and thickening power. Thus, there can be employed the product sold under the designation Burtonite No. 78, by The Burtonite Co., Nutley, New Jersey.

Synthetic elastomeric binders may also be employed, such as polyvinyl alcohol, styrene-butadiene copolymers, and the like.

A small amount of a plasticizer, namely from about 1% to 5% by weight, is advantageously incorporated in the sheet mixture to improve the flexibility of the resulting sheet. The plasticizer may be a polyhydric alcohol, such as, for example, glycerol, or a glycol, such as ethylene glycol or propylene glycol.

The foregoing ingredients are preferably employed in the following proportions:

| | Percent by weight |
|---|---|
| Inorganic compound (e.g. alumina trihydrate) | 75-95 |
| Fibrous matrix material | 3-15 |
| Gum binder | 1-5 |
| Plasticizer | 1-5 |

These ingredients are admixed with water in an amount from about 5 to about 20 times by weight of total solids, made into a viscous slurry in any suitable type of mixer and dried at a temperature below that at which the inorganic compound, if hydrated, e.g. alumina hydrate, begins to release its own water of hydration. Some fibrous materials are improved in effectiveness by vigorous shearing action to fibrillate them, as in a blender, Jordan, etc. Some gums require heat and agitation to dissolve.

In accordance with the invention, the inorganic compound, the fibrous matrix material, and the gum binder are formed into a viscous slurry, and this slurry is formed into a dry self supporting sheet. The viscous slurry may be formed into a sheet in many different ways, such as, for example, by extrusion, calendering, molding or by spreading the slurry upon an impermeable film forming surface, which may be arranged in the form of an endless belt. The forming surface may be suitably made of polytetrafluoroethylene (Teflon). The formed sheet is dried to any desired moisture content consistent with its self supporting characteristics, and may be collected as rolls and stored. Inorganic or organic dyes may be included in the sheet mixture and produce desired colors.

The particle size of the inorganic compound is not critical, but particles should preferably be finer than 325 mesh to avoid rough surfaces that tend to powder and that make the sheet less strong. Thus, where alumina trihydrate is employed, the average particle size may be about 25 microns.

The following examples illustrate the practice of the invention, but are not to be regarded as limiting:

Example 1

20 grams of alumina trihydrate having a fineness such that approximately 90% is minus 325 mesh, and averaging about 25 microns in diameter, is admixed with 2 grams of chrysotile asbestos fibers, and 1 gram of guar gum binder (Burtonite No. 78). The mixture is made into a viscous slurry with 300 ml. water. The slurry is spread on a sheet of polytetrafluoroethylene (Teflon) plastic provided with retaining edges, and placed in an oven at 100° C. until dry. The sheet is stripped off and collected in a roll. The sheet was light and coherent, 3-6 mils in thickness and capable of being shredded.

Example 2.—Other fibrous matrix compositions

| Matrix | Weight (g.) | Alumina Trihydrate (g.) | Water (ml.) | Glycerol (g.) | Butonite 78 (g.) |
|---|---|---|---|---|---|
| Sulfite paper pulp | 4 | 40 | 350 | 1 | 2 |
| Glass wool | 2 | 20 | 100 | 0.5 | 1 |
| No. 150 cotton thread | 2.8 | 28 | 300 | 0.7 | 1.4 |

Example 3

This example illustrates common fillers that may be used with the asbestos matrix:

I. A stock matrix slurry was prepared by blending for 2 minutes in an Oster blender:

(a) 6 grams chrysotile asbestos,
(b) 3 grams Burtonite No. 78 guar gum,
(c) 1.8 grams glycerol, and
(d) 1,000 ml. distilled water.

II. To 250 ml. of the above matrix slurry there were added, respectively:

(a) 15 grams talc,
(b) 15 grams kaolin clay,
(c) 15 grams ferric hydroxide, and
(d) 15 grams silicic acid.

After further blending each of the four slurries was cast into a sheet on a Teflon plate and dried at 105° C. in an electric oven. The sheets were coherent and pliable.

Example 4

Proceeding as in Example 1, a slurry was made using 20 grams calcium carbonate (crushed limestone) in place of the alumina trihydrate. A white coherent sheet capable of being shredded was obtained.

Example 5

Proceeding as in Example 1, a slurry was made using 20 grams of calcium oxide in place of the alumina trihydrate. A white coherent sheet capable of being shredded was obtained.

Example 6

Proceeding as in Example 1, a slurry was made using 20 grams of titanium dioxide in place of the alumina trihydrate. A white coherent sheet capable of being shredded was obtained.

Example 7

Proceeding as in Example 1, a slurry was made using 20 grams of aluminum oxide $Al_2O_3$ in place of the alumina trihydrate. A white coherent sheet capable of being shredded was obtained.

Example 8

Proceeding as in Example 1, a slurry was made using 20 grams of magnesium oxide in place of the alumina trihydrate. A white coherent sheet capable of being shredded was obtained.

Example 9

Proceeding as in Example 1, a slurry was made using 20 grams kaolin clay in place of the alumina trihydrate. A white coherent sheet capable of being shredded was obtained.

Example 10

20 grams of alumina trihydrate having the fineness such that approximately 90% is minus 325 mesh, and averaging about 25 microns in diameter, is admixed with 2 grams of "Fiberfrax" (an aluminum silica ceramic fiber), and 1 gram of guar gum binder. The mixture is made into a viscous slurry with 300 ml. water. The slurry is spread on a sheet of Teflon and dried in an electric oven at 100° C. When stripped off the sheet is white and coherent.

Example 11

An aqueous slurry was prepared from 4 grams kraft paper (unbleached kraft fibers), 40 grams alumina trihydrate, 1 gram glycerol, 2 grams guar gum and 350 ml. water. The slurry was spread on a Teflon plate and dried at 100° C. The resulting sheet was buff colored and had a marble appearance.

Example 12

10 grams of bleached sulfate pulp (kraft pulp) were soaked in 200 ml. water and then beaten in a Waring Blendor for 1 minute after which there was added to the slurry 42.5 grams of alumina trihydrate (minus 325 mesh) and 42.5 grams of a low melting point glass frit (Ferrofrit 3141, Ferro Corp., Cleveland, Ohio). This frit is of a type commonly used for pyrometric cones and is a sodium borosilicate melting in the range of 750–800° C. 5 ml. glycerol were added to the slurry. 5 grams of Methocel HC (hydroxypropylcellulose) having a viscosity of 15,000 centipoises were dissolved in another 200 ml. water and added to the slurry of the other ingredients. After mixing for 1 minute the slurry was spread out on a stainless steel plate and dried in an oven at 105° C. The sheet when stripped off was white in color, flexible and coherent.

Example 13

A kraft pulp sheet was prepared as described in Example 12 except that instead of the Methocel HC there was used as a binder 10 grams of ethylated starch (A.E. Staley Co., Ethylex No. 2065). The sheet was flexible and coherent.

Example 14

A kraft pulp sheet was prepared as in Example 12 using instead of hydroxypropylcellulose 5 grams of methylcellulose having a viscosity of 4,000 cp. The sheet was flexible and coherent.

Example 15

A sheet was prepared as described in Example 1 using 1 gram of gum tragacanth instead of the guar gum as a binder. The sheet was flexible and coherent.

Example 16

A sheet was prepared as described in Example 1 using 1 gram of gum arabic instead of the guar gum as a binder. The sheet was flexible and coherent.

What is claimed is:
1. An inorganic hydroxide-fibrous matrix composition in the form of a flexible, shreddable sheet, said composition consisting essentially of from about 75% to about 95% by weight of an inorganic hydroxide selected from the group consisting of aluminum, magnesium, and calcium hydroxides; from about 3% to about 15% by weight of a fibrous material selected from the group consisting of asbestos, a fibrous ceramic aluminum silicate, and cellulosic fibers; from about 1% to about 5% by weight of a binder selected from the group consisting of a water soluble vegetable gum and a water soluble ethylated starch; and from about 1% to about 5% by weight of a polyhydric alcohol plasticizer, the amounts of the inorganic hydroxide, the fibrous material, the binder, and the plasticizer being adjusted so as to total 100%.

2. The composition of claim 1 in which the inorganic hydroxide is alumina trihydrate.

3. The composition of claim 1 in which the vegetable gum is guar gum.

4. An alumina trihydrate-fibrous matrix composition in the form of a flexible, shreddable sheet, said composition consisting essentially of from about 75% to about 95% by weight of alumina trihydrate; from about 3% to about 15% by weight of asbestos; from about 1% to about 5% by weight of a guar gum binder; and from about 1% to about 5% by weight of a polyhydric alcohol plasticizer, the amounts of the alumina trihydrate, the asbestos, the guar gum binder, and the plasticizer being adjusted so as to total 100%.

5. The composition of claim 4 in the form of shredded particles.

References Cited

UNITED STATES PATENTS

| | | |
|---|---|---|
| 2,875,098 | 2/1959 | Blatz. |
| 1,544,215 | 6/1925 | Caldwell _____ 106—209 |
| 2,226,823 | 12/1940 | Kropscott _____ 106—189 |
| 2,390,765 | 12/1945 | York et al. |
| 2,398,047 | 4/1946 | Schmidt. |
| 2,594,498 | 4/1952 | Rohn _____ 106—189 |
| 2,870,059 | 1/1959 | Williams et al. |
| 2,884,380 | 4/1959 | Cook et al. |
| 2,993,017 | 7/1961 | Sucetti. |
| 2,993,799 | 7/1961 | Blake. |

JAMES A. SEIDLECK, Primary Examiner

H. H. FLETCHER, Assistant Examiner

U.S. Cl. X.R.

106—163, 189, 193, 204, 208, 213, 214; 131—10.5, 17, 266; 260—33.4, 41, 41.5